Nov. 25, 1930.  W. STELZER  1,782,750

AIRPLANE CONTROL

Filed Feb. 18, 1929

Inventor.

William Stelzer

Patented Nov. 25, 1930

1,782,750

UNITED STATES PATENT OFFICE

WILLIAM STELZER, OF CHICAGO, ILLINOIS, ASSIGNOR TO BENDIX AVIATION CORPORATION, OF NEW YORK, N. Y., A CORPORATION OF DELAWARE

AIRPLANE CONTROL

Application filed February 18, 1929. Serial No. 340,762.

The invention relates to improvements in airplane control, in which the longitudinal stability of the airplane is controlled by operable outboard struts interposed between the wings and a portion of the body forward of said wings, having an airfoil section whose angle of attack is larger than that of the wings.

The object of the invention is to utilize the control surfaces to produce lift and at the same time to serve as reinforcing structural members of the airplane.

Another object, namely to provide better protection for the occupants, is attained by the disposition of the body forward of the center of gravity, whereby overturning of the airplane when landing is impossible and when running against an obstacle the forward portion is destroyed first and thereby serves as a shock absorber. The arrangement also permits the application of brakes to the landing wheels, so that the plane may land on a small place.

Still another object is to increase the longitudinal inherent stability of the airplane by giving the control surfaces a larger positive angle of attack than the wings have. Thereby the stalling of the airplane is practically made impossible because the critical angle of attack occurs first at the control surfaces forward of the wing and causes the nose to drop.

The invention also aims to provide an operating mechanism which permits individual operation of each control surface, whereby the ailerons may be dispensed with.

It is apparent that the operating mechanism for the control system hereinafter described is greatly simplified as compared with other types, and that it is much easier for the pilot to judge the position of the airplane by seeing the control surfaces in front of him.

An illustration of the invention is given in the following detailed description and the accompanying drawing, wherein.

The terms employed herein are used in the generic and descriptive sense and therefore are not intended primarily as terms of limitation.

Figure 1:
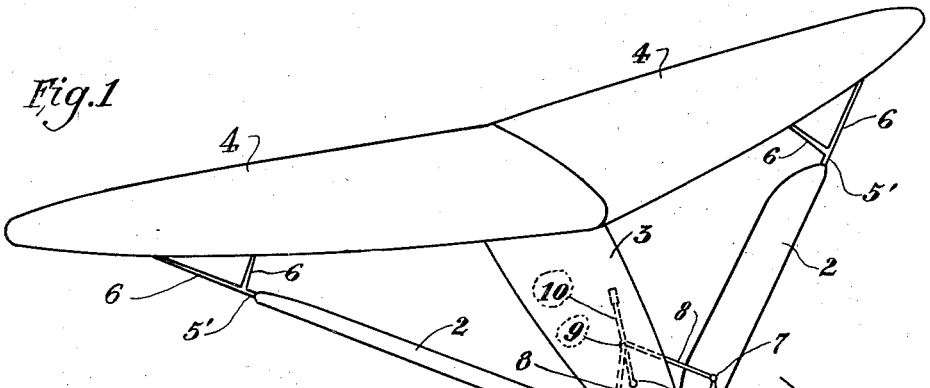
Fig. 1 is a perspective view of an airplane provided with the improved control mechanism. This view is only diagrammatic, the propelling mechanism, landing gear, and rudder being left off.

1 indicates the direction of flight. Referring to Fig. 1, the operable struts or elevators 2 extend from the nose of the body 3 upward and backward to the outer portions of the wings 4 and are rotatable about a line parallel to their centroidal axes by means of swivel joints 5 and 5'. The struts 6 may be regarded as a portion of the wings 4 to which they are rigidly secured and serve to hold the swivel joints 5'. Instead of these swivel joints 5 and 5' any other suitable pivotal means may be employed, the form shown in Fig. 2 being used in the described embodiment to prevent bending along the axes of rotation, and thereby helping to increase the torsional stiffness of the wings 4.

The elevators 2 are provided with horns 7 connected preferably by means of ball joints to the operating rods 8 connected to the ball joints 9 of the control stick 10 pivoted to the body 3 by means of a ball joint 11.

Figure 2:
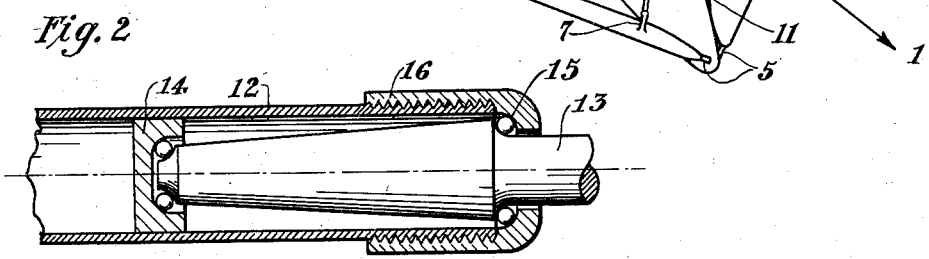
Fig. 2 is a detailed longitudinal section through the swivels or pivotal supports for the control surfaces.

A detailed view of the swivel joints or hub bearings 5 and 5' is shown in Fig. 2. The hub 12 may be the stationary part of the swivels 5 and 5' rigidly secured to the nose of the body and the struts 6 respectively. The terminations 13 of the elevators 2 are rotatably supported in the hub 12 by means of the hub bearings 14 and 15, the latter having a threaded cap 16 by means of which the bearings may be adjusted.

Figure 3:
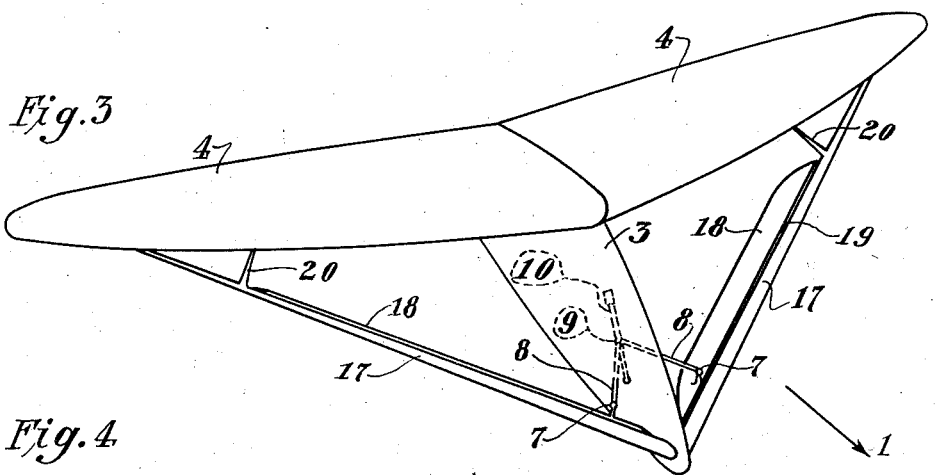
Fig. 3 illustrates a modification of the invention.

In the modified form of embodiment shown in Fig. 3, rigid outboard struts 17 are interposed between the nose of the body 3 and the outer portion of the wings 4. To these struts 17 elevators 18 are hinged by means of hinges 19 and operable in the same manner as described for the embodiment shown in Fig. 1. The struts 17 and the elevators 18 together have airfoil section. The short struts 20 serve to brace the outboard struts 17.

Figure 4:
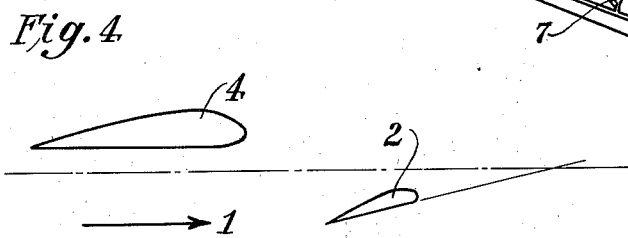
Fig. 4 illustrates the relation between the control surfaces and the wings.

An illustration of the relation between the wings 4 and the outboard struts or elevators 2 is given in Fig. 4; which also applies to the modified form shown in Fig. 3. The longitudinal dihedral angle is negative, i. e., the elevator 2 is given a steeper angle of wing setting than has the wing 4 so that the critical angle of attack occurs first at the elevator 2, causing the nose of the airplane to drop before the stalling point is reached.

By inspection of the drawing it may become apparent that fore-and-aft movement of the control stick controls the longitudinal stability and side to side movement controls the lateral stability, whereby the ailerons may be dispensed with. However, lateral and directional stability may be controlled by any standard mechanism (not shown), and the control of the described elevators may be incorporated in said standard mechanism.

I do not desire to be limited in the application of my invention nor in the appended claim to the particular embodiment, pointed out in the affixed drawing.

Further embodiments, modifications and variations may be resorted to within the spirit and scope of the invention as here claimed.

I claim:

An airplane comprising a main carrying plane, a body supported thereby having a portion extending well forward of the main carrying plane, a plurality of elements each combining the function of an elevator, aileron and a strut connecting the carrying plane to the forward end of the extended body portion, an operating lever positioned on the body portion and linkage connecting each of the elements to the operating lever.

WILLIAM STELZER.